United States Patent
Kato et al.

(10) Patent No.: US 6,466,851 B2
(45) Date of Patent: Oct. 15, 2002

(54) VEHICLE CONTROL SYSTEM FOR CONTINUOUSLY VARIABLE TRANSMISSION HAVING MANAGER CONTROL UNIT

(75) Inventors: Yoshifumi Kato, Nishikamo-gun; Tsutomu Tashiro, Nagoya; Noboru Miyamoto; Takehito Fujii, both of Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/876,042

(22) Filed: Jun. 8, 2001

(65) Prior Publication Data

US 2001/0056320 A1 Dec. 27, 2001

(30) Foreign Application Priority Data

Jun. 22, 2000 (JP) .......................... 2000-187744

(51) Int. Cl.$^7$ ................................. G06F 7/00
(52) U.S. Cl. ............................ 701/51; 701/54; 701/61; 701/53; 477/34; 477/78
(58) Field of Search .......................... 701/51, 52, 53, 701/54, 61; 477/34, 78

(56) References Cited

U.S. PATENT DOCUMENTS

| | | | |
|---|---|---|---|
| 5,081,583 A | 1/1992 | Kono et al. | 364/424.1 |
| 5,351,776 A | 10/1994 | Keller et al. | 180/79.1 |
| 6,154,688 A | 11/2000 | Dominke et al. | 701/1 |

FOREIGN PATENT DOCUMENTS

| | | |
|---|---|---|
| DE | 19745752 A1 | 4/1998 |
| DE | 19935147 A1 | 2/2000 |
| EP | 0953469 A2 | 11/1999 |
| GB | 2033981 A | 9/1979 |
| GB | 2242716 A | 10/1991 |
| GB | 2248660 A | 4/1992 |
| GB | 2348298 A | 9/2000 |
| JP | 9-214535 | 8/1997 |
| JP | 11-141664 | 5/1999 |

*Primary Examiner*—Yonel Beaulieu
(74) *Attorney, Agent, or Firm*—Nixon & Vanderhye P.C.

(57) ABSTRACT

In a vehicle control system of this invention, a CVT ECU does not executes the calculations such as a gear ratio, etc., but simply controls the gear ratio of a CVT on the basis of the target gear ratio and a CVT input torque transmitted from a manager ECU by way of a communication line. Accordingly, when mounting a CVT unit constructed with the CVT and the CVT ECU in a vehicle, the vehicle control does not need to tune the CVT ECU one by one, even though the types and engines of vehicles are varied. Therefore, it is possible to configure the CVT unit independently of the types of vehicles, which achieves standardization or generalization of the CVT unit in terms of both the hardware and the software.

10 Claims, 5 Drawing Sheets

VEHICLE CONTROL SYSTEM FOR CONTINUOUSLY VARIABLE TRANSMISSION HAVING MANAGER CONTROL UNIT

CROSS REFERENCE TO RELATED APPLICATION

This application is based on and incorporates herein by reference Japanese Patent Application No. 2000-187744.

BACKGROUND OF THE INVENTION

The present invention relates to a control system of a vehicle equipped with a continuously variable transmission, specifically to a vehicle control system suitable for the standardization and rationalization, etc., of plural component units that are incorporated in the vehicle, including the continuously variable transmission.

An integrated control system is proposed to achieve a stabilized control of the whole vehicle, by making up the system so as to mutually exchange data between control, units provided individually with these plural functional units.

This type of the integrated control system connects control calculation units of the functional units each other by way of a communication line. The system is configured so that the control calculation units can mutually use calculation values and detection values and so forth that the control calculation units each acquire.

However, in such a configuration that the functional units each do not hold completely independent control units, some functional units have to wait for transmissions of the calculation values and detection values that the other functional units acquire. The functional units have to perform the individual calculations. Accordingly, there is a possible apprehension of delay in response that does not occur in the conventional mode that provides the control calculation units to the functional units each to determine the behavior of the vehicle and performs the control operation according to that behavior.

Especially, the delay in response given to the transmission control of a vehicle comes out in a form of an operational delay on the transmission side with regard to a gear shifting demand on the vehicle side. If a multistage transmission that gradually varies the axle torque during a gear shifting is adopted as an automatic transmission, when a gear shifting command to another stage interrupts by any reason during a shifting operation, the foregoing delay in response will lead to an unstable shifting control, and generate a shock to the vehicle due to abrupt variations of the axle torque during a gear shifting.

SUMMARY OF THE INVENTION

It is therefore an object of the invention to provide a vehicle control system that is suitable for the integrated control of a vehicle equipped with a continuously variable transmission and for reduction of shift shock caused by the transmission.

It is another object of the invention to provide a vehicle control system that is suitable for standardization and rationalization and so forth of plural component units of the vehicle.

According to the present invention, a command value of a gear ratio of a continuously variable transmission equipped in a vehicle is calculated, an input torque to the continuously variable transmission is detected, and the gear ratio of the continuously variable transmission is controlled on the basis of these calculation value and detection value. A gear ratio control unit having a function of gear ratio control and one or plural function units for the gear ratio calculation and the torque detection are constructed in different units each other. Those units are mutually connected through a communication line capable of data transmission. The gear ratio control unit does not carry out the calculation of the gear ratio, etc., and the gear ratio control unit simply controls the gear ratio of the continuously variable transmission on the basis of the command value of the gear ratio and the input torque transmitted to the gear ratio control unit through the communication line.

Accordingly, when loading the gear ratio control unit in a vehicle, even though the type and the engine of the vehicle is varied, the system of the invention does not need to tune the gear ratio control unit one by one in correspondence therewith. Therefore, the system is able to configure the continuously variable transmission and the gear ratio control unit independently of the type of the vehicle, which achieves standardization (generalization) of the continuously variable transmission in terms of both the hardware and the software. The gear ratio calculation and the torque detection are required to modify the control variables and so forth that they use, depending on the type of the vehicle. However, if both of these means are configured in one functional unit, the parts to be modified can be concentrated in both aspects of the hardware and the software. In this manner, it is convenient to concentrate the parts to be modified in respect of the system design and the management.

Further, an achievement of the standardization of the continuously variable transmission will lead to carrying out a development of the control system of the continuously variable transmission and a development of the control system of the engine independently in parallel. Therefore, a development of the gear ratio control unit in conformity to the continuously variable transmission and a development of a new logic that the gear ratio control means performs, and so forth will be carried out without needing to wait for a development of an engine. The final adjustment on mating a continuously variable transmission with an engine can be carried out swiftly. Accordingly, the total term for developing a vehicle equipped with a continuously variable transmission can be shortened.

BRIEF DESCRIPTION OF THE DRAWINGS

The above and other objects, features and advantages of the invention will become more apparent from the following detailed description made with reference to the accompanying drawings. In the drawings.

DETAILED DESCRIPTION OF THE PREFERRED EMBODIMENT

Figure 1:
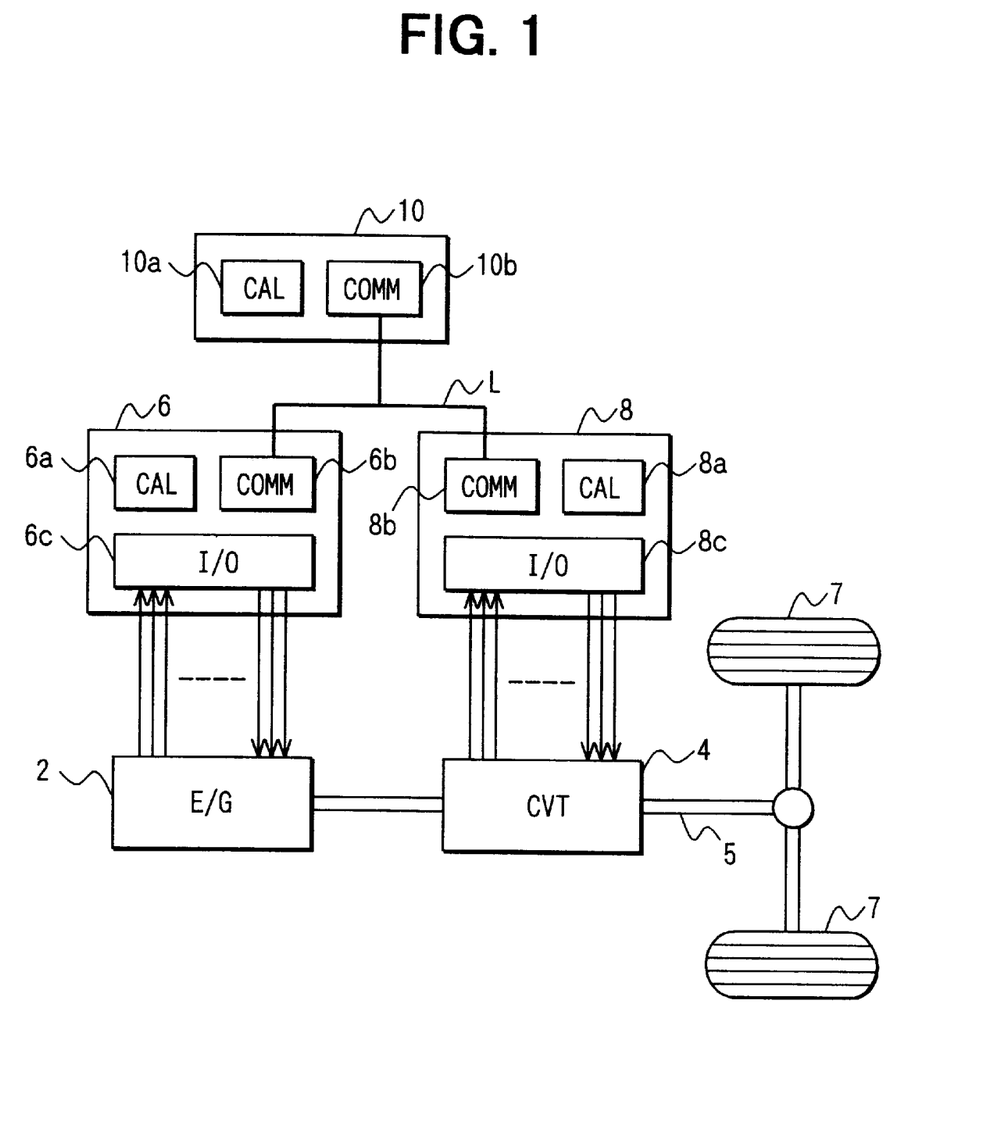
FIG. 1 is a structural block diagram illustrating a vehicle control system according to an embodiment of the present invention.

Referring first to FIG. 1 illustrating a vehicle control system, a power train control system controls an engine 2 and a continuously variable transmission (CVT) 4 that are components of the vehicle drive system. This system includes an engine (E/G) ECU 6 and a CVT ECU 8 that control the engine 2 and the CVT 4, respectively, and a manager ECU 10 that instructs operational guidelines of the engine 2 and the CVT 4 to the engine ECU 6 and the CVT ECU 8.

The ECUs 6, 8, and 10 each are electrical control units that are individually independently configured with processing units 6a, 8a, and 10a constructed with microcomputers as the central components. The ECUs 6, 8, and 10 each embrace communication units 6b, 8b, and 10b that are mutually connected through a data communication line L. Thereby, the ECUs 6, 8, and 10 are made to mutually transmit and receive data for the power train control.

Since the engine ECU 6 and the CVT ECU 8 are to control the engine 2 and the CVT 4, the engine ECU 6 and the CVT ECU 8 include signal: input/output units 6c, 8c that take in detection signals from various sensors to detect the states of the engine 2 and the CVT 4, and output drive signals to various actuators equipped with the engine 2 and the CVT 4. The CVT 4 drives vehicle wheels 7 through an axle shaft 5.

The signal input/output unit 6c of the engine ECU 6 has various sensors and switches connected, such as an accelerator position sensor to detect depression of an accelerator pedal by a driver, an air flow meter to detect a flow rate (intake air amount) of intake air, a temperature sensor to detect a temperature of intake air, a throttle angle sensor to detect an angle of a throttle valve, an oxygen concentration sensor to detect an oxygen concentration in exhaust gas, a knock sensor to detect a knocking, a temperature sensor to detect a cooling water temperature, a crank angle sensor to detect a rotation angle of a crankshaft and a rotation speed thereof, an ignition switch, etc.

The unit 6c also has various actuators to control the engine 2 connected, such as injectors each furnished with cylinders of the engine 2, an igniter to generate a high voltage for ignition, a fuel pump to draw up a fuel from a fuel tank and supply it to the injector, a throttle drive motor to open and close the throttle valve furnished with an inlet pipe of the engine 2, and so forth.

The signal input/output unit 8c of the CVT ECU 8 has various sensors and switches connected, such as a rotational speed sensor to detect a rotational speed of an input axis to a gearbox from a torque converter that constitute the CVT 4, a vehicle speed sensor to detect a vehicle speed from a revolution of a vehicle driving axle coupled with an output shaft of the CVT 4, an oil temperature sensor to detect a temperature of a hydraulic oil in the CVT 4, and a stop lamp switch to detect a state of a stop lamp lit by a brake operation of a driver, etc.

The unit 8c also has various actuators (solenoids) to control the CVT 4 connected, such as a gear ratio solenoid to control a gear shifting, a line pressure solenoid to control a tension of a belt, so as to transmit a torque without a belt slip of the CVT 4, a lockup pressure solenoid to control a tightening force of a lockup clutch that tightens the input/output shaft of the torque converter, and so forth.

In the ECUs 6, 8, and 10, the processing units 6a, 8a, and 10a each execute control processing (engine control processing, CVT control processing, power train control processing) for controlling the engine 2, the CVT 4, and the whole system, in accordance with the control program pre-stored in a memory.

Figure 2:
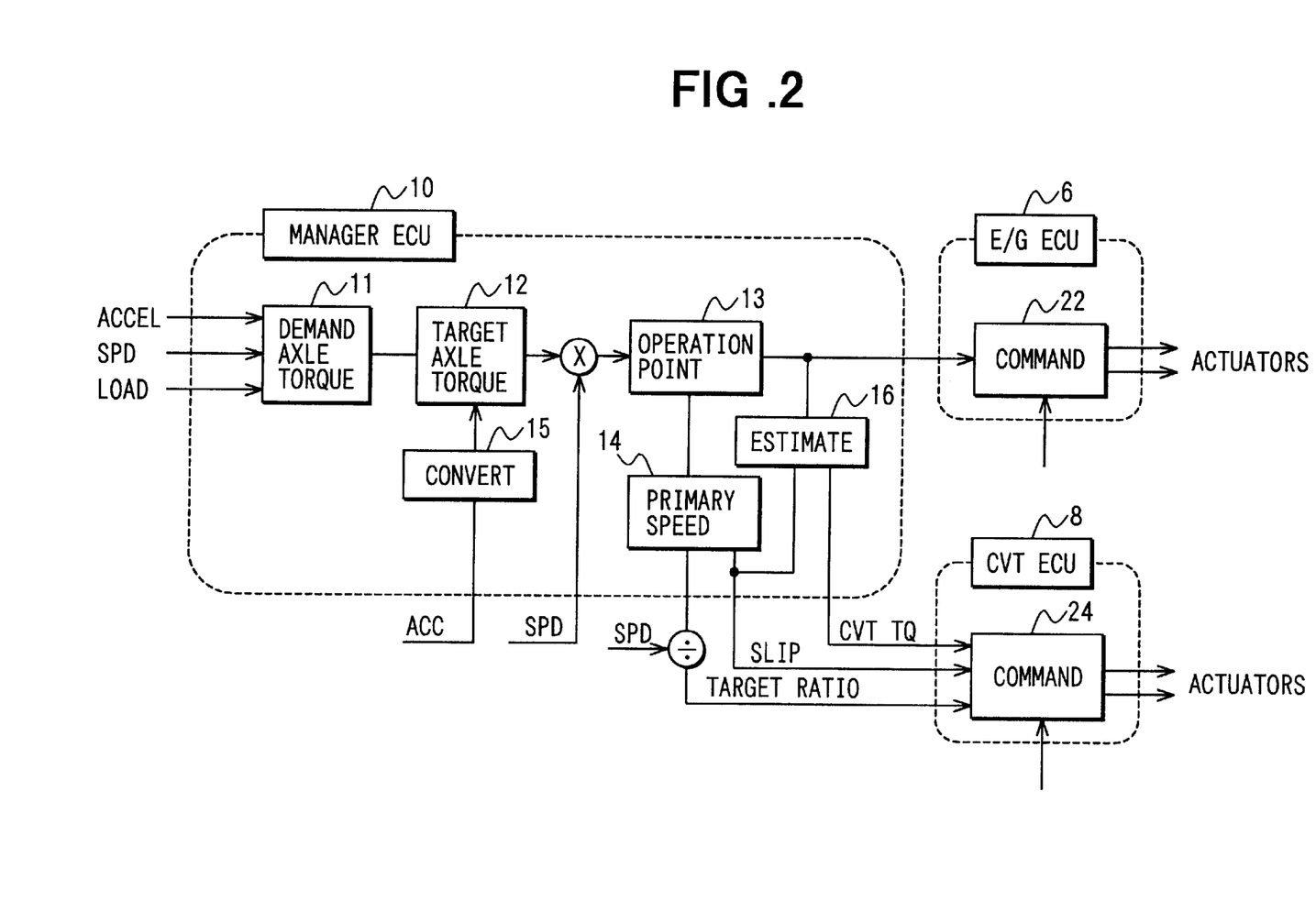
FIG. 2 is a functional block diagram illustrating control processing carried out by ECUs used in the embodiment.

Next, the control processing carried out by the ECUs 6, 8, and 10 will be described. FIG. 2 is a block diagram illustrating the control processing carried out by the ECUs 6, 8, and 10 by way of functional blocks.

As shown in FIG. 2, in the power train control processing executed by the manager ECU 10, first a demand axle torque calculation unit 11 calculates an axle torque demanded by a driver on the basis of the accelerator position that shows a demand for the acceleration deceleration of a vehicle by the driver, and a vehicle speed that shows an actual travel state of the vehicle, and a load, etc., and outputs the result to a target axle torque determination unit 12.

In addition to the demand axle torque by the driver, the target axle torque determination unit 12 receives demand axle torque inputs from the other functional units demanding a control of the axle torque, such as a control unit (ACC: adaptive cruise control) for an inter-vehicle distance between vehicles that permits a travel in which a distance between a vehicle and the one in front is regularized by measuring the distance between the vehicles with a laser radar, a vehicle stabilization unit (VSC) that maintains a travel stability of a vehicle during traveling a curve, an antilock brake unit (ABS) that prevents a lock of drive wheels on jamming the brakes, and a traction control unit (TRC) that prevents an acceleration slip of drive wheels.

Accordingly, when there are demand axle torque inputs from these functional units, a demand axle torque being the control target is selected in accordance with the priority preset by the state of the vehicle. When an inertia torque is generated due to the variation of a torque consumed by an accessory such as an air conditioner or an alternator that gives influence on the variation of the axle torque, or due to the variation of the engine speed, the target axle torque determination unit 12 calculates these to correct the demand axle torque, and determines the final target axle torque.

Now, first a case will be described, in which a demand axle torque from the foregoing other functional units is not inputted to the target axle torque determination unit 12.

In this case, as the demand axle torque by a driver is corrected and the target axle torque is determined, as mentioned above, the axle rotational speed detected by the vehicle speed sensor is integrated to the target axle torque, and a power is calculated which is required for extracting the concerned target axle torque from the engine. The power calculated here is inputted to an operating point determination unit 13. Since this power is acquired by a combination (integrated value) of the engine torque and the engine speed in general, the combination has a degree of freedom. However, the operating point determination unit 13 of this embodiment determines the operating point determined by the engine torque and the engine speed on the basis of the condition under which the fuel economy is optimized.

Figure 3:
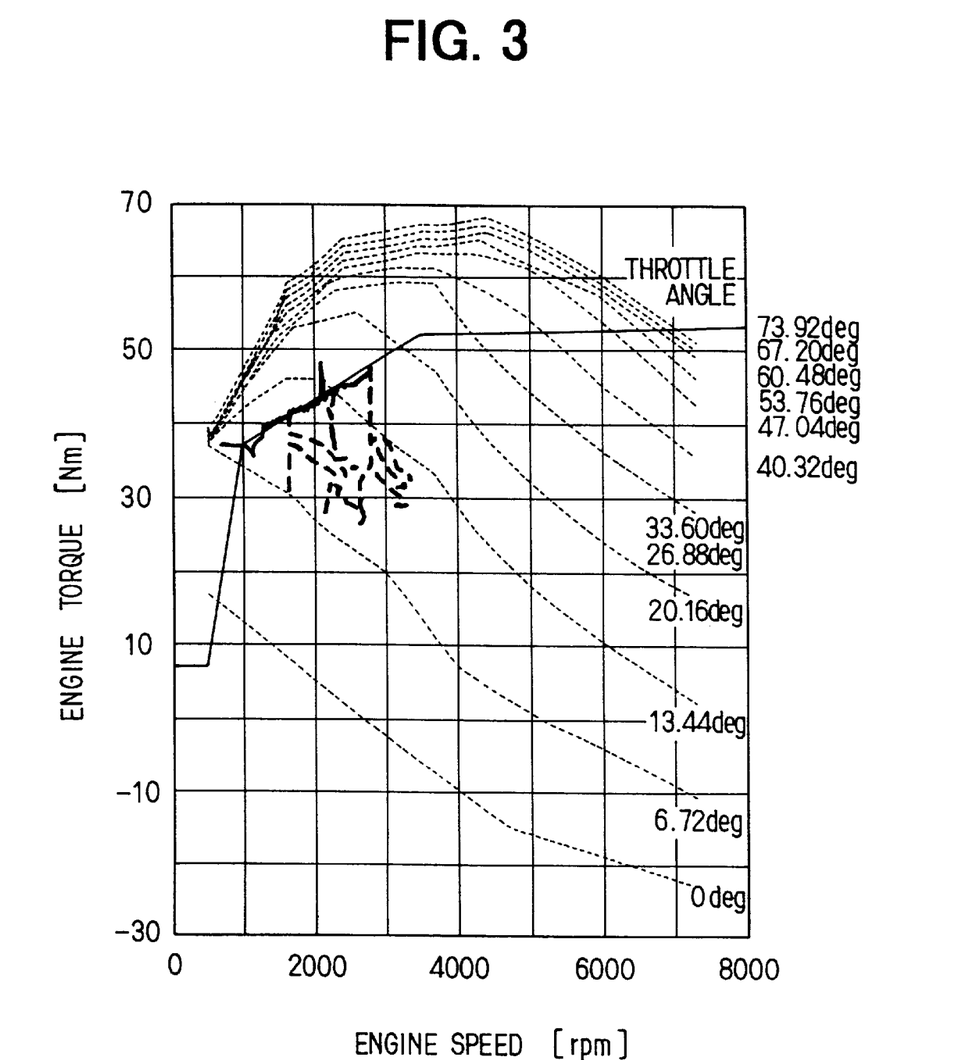
FIG. 3 is a characteristic diagram illustrating a map for setting an operating point of an engine in the embodiment.

FIG. 3 illustrates one example in which the engine torque determined at this moment is calculated with regard to the engine speed treated as the parameter. In the figure, thin dotted lines illustrate the engine torque characteristics corresponding to the variations of the throttle angles, and a thin solid line illustrates the engine torque where the fuel economy is optimized with the engine speed treated as the parameter. Therefore, the operating point determination unit 13 determines an operating point on the curve (or straight line) shown by the thin solid line as the target value. Hereunder, the engine torque and the engine speed determined at this moment will be referred to as the target engine torque and the target engine speed, respectively.

Further, in the same figure, in the mechanism constructed with the foregoing torque converter and lockup clutch, in the vehicle control system equipped with the lockup slip control device of this embodiment is illustrated with a thick solid line the engine operating point in which the above control is carried into effect and a vehicle is brought in a travel; and as acomparison example to this, in a vehicle control system not equipped with the lockup slip control device is illustrated with thick dotted lines the engine operating point in which the above control is carried out with the lockup clutch opened and the vehicle is brought in a travel.

From this comparison, in the vehicle control system not equipped with the lockup slip control device, in a state of the lockup clutch being opened, it is difficult to maintain the engine operating point on the thin solid line where the fuel economy is optimized. In contrast to this, however, in the vehicle control system equipped with the lockup slip control device of this embodiment, it is confirmed as feasible to maintain the engine operating point on the thin solid line. This shows that an adoption of the lockup slip control device will enhance the controllability of the engine operating point in such a rotational speed range that the torque converter is impossible of a direct coupling. That is, this signifies that the lockup slip control device displays a significant effect in controlling the operating point of the engine, in addition to the primary effect to reduce the energy loss in the torque converter and enhance the fuel economy.

Further, since the continuously variable transmission is capable of starting the lockup slip control from a low speed range compared to the multistage transmission, this system employing the continuously variable transmission (CVT 4) is able to further enhance the control accuracy of the engine operating point in comparison to the multistage transmission, which is advantageous.

The target engine torque determined by the operating point determination unit 13 is outputted to the engine ECU 6 and the CVT ECU 8. On the other hand, the target engine speed is inputted to a primary rotational speed determination unit 14. The primary rotational speed determination unit 14 calculates a slip amount used in the lockup slip control from the target engine speed, and a target primary rotational speed obtained from the slip amount and the target engine speed. The slip amount calculated here is inputted to the CVT ECU 8 as it remains. On the other hand, the target primary rotational speed is divided by the axle rotational speed detected by the vehicle speed sensor, and the result is outputted as a target gear ratio to the CVT ECU 8.

Here, in the engine ECU 6, an actuator command setting unit 22 sets a throttle angle, fuel injection quantity, and ignition timing that are required for achieving the target engine torque by a preset target air-fuel ratio, on the basis of the target engine torque transmitted from the manager ECU 10 and the detection signals from the above sensors and switches. On the basis of the values thus set, the actuator command setting unit 22 generates command values (drive signals) for driving the injector, igniter, fuel injection pump, and throttle drive motor, and outputs these to each of the actuators.

Further, in the manager ECU 10, a CVT input torque estimation unit 16 estimates a CVT input torque inputted to the CVT 4 on the basis of the target engine torque, an L/U clutch slip amount, and the T/C characteristics. On the other hand, in the CVT ECU 8, a solenoid command setting unit 24 calculates a line pressure command value that makes it possible to transmit a torque without a belt slip of the CVT 4 and to reduce a hydraulic pressure loss as much as possible, on the basis of the target gear ratio and the slip amount transmitted from the manager ECU 10 and the CVT input torque transmitted in the same manner from the manager ECU 10, and the detection signals from the above sensors and switches, generates a command value (drive signal) for driving the line pressure solenoid, and outputs the command value to the line pressure solenoid. The solenoid command setting unit 24 generates a command value (drive signal) for driving the gear ratio control solenoid whereby the actual gear ratio becomes coincident with the target gear ratio, and outputs the command value to the gear ratio control solenoid.

Further, the solenoid command setting unit 24 calculates a lockup clutch pressure command value so as to realize a lockup state (release lockup clutch, slip lockup, lockup clutch tightened) that is set in advance from the consideration of the fuel economy and the gear shift feeling, and outputs the command value to a lockup clutch solenoid; thus the lockup control is executed.

Furthermore, in the demand axle torque calculation unit 11, the target axle torque determination unit 12, the operating point determination unit 13, and the primary rotational speed determination unit 14, the control rules for setting the command values and the target values, etc., are stipulated by maps or calculation expressions stored in the memory in advance, and these maps or expressions are used in practically setting the command values or the target values.

Figure 4:
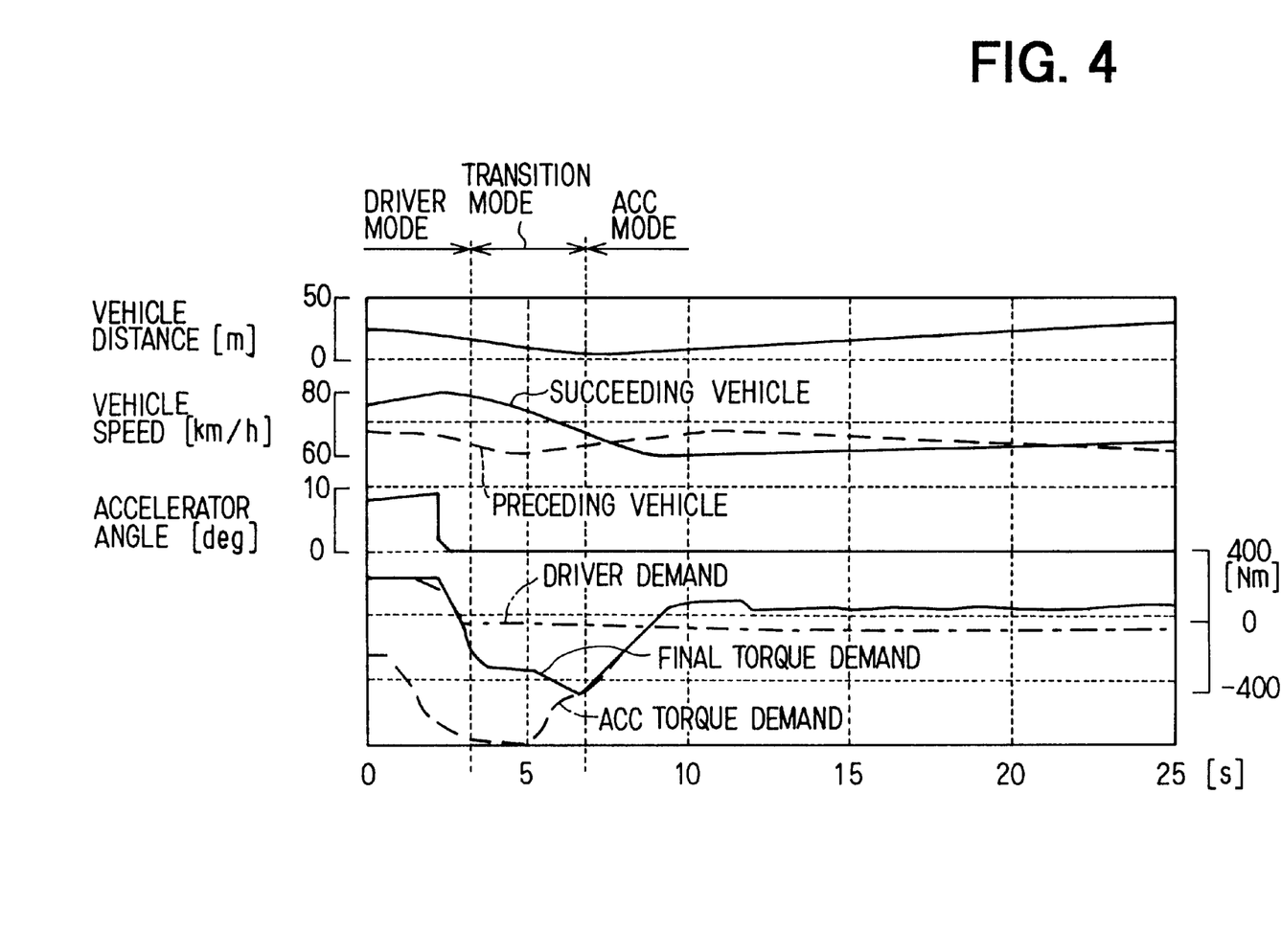
FIG. 4 is an operation diagram illustrating a power train control in the embodiment.

Next, the processing will be described on the basis of FIG. 2 and FIG. 4, in which the demand axle torques from the other functional units are inputted to the target axle torque determination unit 12. Here, FIG. 2 illustrates an example in which the demand axle torque is inputted from the above unit (ACC (Adaptive Cruise Control): not illustrated) for controlling a distance between vehicles, in addition to the demand axle torque by a driver. FIG. 4 illustrates an example in which, after the driver depresses an accelerator pedal to accelerate the vehicle, the ACC executes the specific control for a distance between vehicles.

First, FIG. 4 illustrates a situation in which a driver of a succeeding vehicle depresses the accelerator pedal to increase the vehicle speed by any reason (refer to the middle in the figure), but senses a danger of approaching to the vehicle in front at about 2 seconds after depressing the accelerator pedal and stops depressing.

In this example, since the demand from the driver is set higher in priority than the demand from the ACC, in the foregoing vehicle control system, the vehicle control is carried out on the basis of the driver's intention for about 3 seconds from the moment that the driver depresses the accelerator pedal till the moment that the driver releases the depression and the accelerator position returns to zero. That is, the target axle torque determination unit 12 performs the vehicle control on the basis of the demand axle torque (the lower in the figure: alternate long and short dash line) from the driver (this is called "driver mode").

When the accelerator position returns to zero, originally the vehicle control thereafter is to be carried out on the basis of the demand axle torque from the ACC (this is called, 'ACC mode') since the demand axle torque from the driver disappears; however, this embodiment provides a transient mode that executes a smooth shift from the driver mode to the ACC mode.

That is, in the direct shift from the driver mode. to the ACC mode, at the moment of the driver mode being released, if the distance between the vehicles is shorter than the preset threshold, the ACC will operate to put on a sudden engine brake. The sudden engine brake generates a shock to the vehicle, and gives the driver unpleasant feeling. Accordingly, this embodiment provides the transient mode that achieves a smooth shifting from the driver mode to the ACC mode.

Specifically, the vehicle control in this transient mode is carried out as follows.

That is, in order to execute the control for a distance between vehicles, a target acceleration is outputted to the manager ECU 10, and a torque conversion unit 15 of the manager ECU 10 converts the target acceleration into a demand axle torque, which is inputted to the target axle torque determination unit 12. Accordingly, when the mode is shifted from the driver mode to the ACC mode, the target axle torque determination unit 12 executes the same calculation processing as the above to the demand axle torque inputted from the ACC.

The target axle torque determined here is outputted to the operating point determination unit 13, however the value of the target torque does not vary abruptly from the previous value, since there is a first order low pass filter provided between the target axle torque determination unit 12 and the operating point determination unit 13.

Therefore, the target axle torque does not abruptly vary from the state of the driver mode (alternate long and short dash line) as shown in the lower part of FIG. 4 to the state of the ACC mode (dotted line), but shifts smoothly by way of the transient mode. That is, the processing with this type of transient mode is executed, whereby the mode is smoothly shifted from the driver mode to the ACC, as shown by the solid line in the lower part of FIG. 4. Accordingly, this prevents a shock to the vehicle generated by an abrupt mode shift, and as shown in the upper part of the drawing, the succeeding vehicle is able to restore a travel under a normal distance between the vehicles being maintained.

Figure 5:
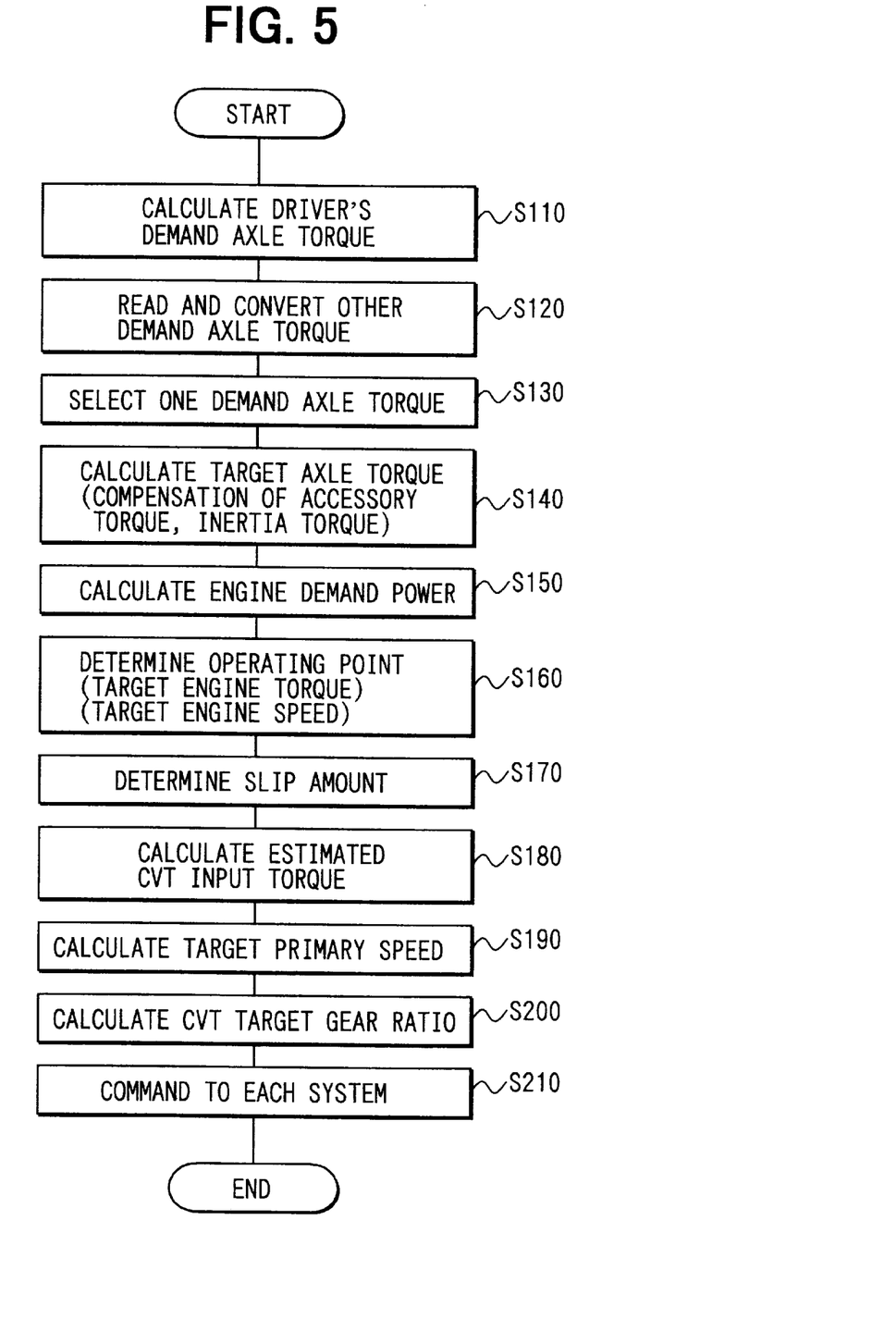
FIG. 5 is a flow diagram illustrating power train control processing executed in the embodiment.

Now, the power train control processing executed by the manager ECU 10 thus configured will be described on the basis of the flow diagram shown in FIG. 5.

First, the step S110 calculates a demand axle torque by a driver. That is, it searches a map prepared on the basis of the accelerator position, vehicle speed, load during a travel on uphill and downhill lanes, and so forth, and converts into the demand axle torque. If there is a demand from the other functional unit, the step S120 will read the demand to convert it into a demand axle torque. The step S130 selects a demand axle torque to be realized in accordance with the predetermined priority out of these plural demand axle torques.

If an accessory such as an air conditioner is in operation, or if an inertia torque is applied which is generated during an ascending or descending travel, or during an accelerated travel, the step S140 will compensate the demand axle torque and calculate the target axle torque. Next, by integrating the axle rotational speed detected by the vehicle speed sensor with regard to the target axle torque determined thereat, the step S150 temporarily converts the target axle torque into the power, and the step S160 determines the operating point for extracting the power from the engine 2 by way of a map retrieval. Thus, the target engine torque and the target engine speed representing the operating point are determined.

On the basis of the target engine speed determined thereat; the step S170 determines a slip amount executed by the lockup slip control device by retrieving prepared maps. On the basis of this slip, the target engine torque, and the T/C characteristics, the step S180 estimates a torque inputted to the CVT 4. Further, the step S190 determines a primary rotational speed of the CVT 4, from the values of the slip amount and the target engine speed. The step S200 divides the axle rotational speed detected by the vehicle speed sensor by this primary rotational speed to thereby calculate the target gear ratio outputted to the CVT ECU 8.

The step S210 outputs the target engine torque thus calculated to the engine ECU 6 and the CVT ECU 8, and also outputs the target gear ratio calculated thereat to the CVT ECU 8.

As mentioned above, in the vehicle control system of this embodiment, the CVT ECU 8, not executing the calculations such as the target gear ratio, etc., controls the gear ratio of the CVT 4 simply on the basis of the target gear ratio and the target engine torque transmitted from the manager ECU 10 by way of the communication line L.

In consequence, when loading the CVT unit constructed with the CVT 4 and the CVT ECU 8 into a vehicle, the vehicle control system of this embodiment does not need to tune the CVT ECU 8 one by one, even though the types and engines of vehicles are different. Therefore, it is possible to configure the CVT unit independently of the types of vehicles, which achieves standardization (generalization) of the CVT unit in terms of both the hardware and the software.

Further, to achieve the standardization of the CVT unit will realize to independently carry out the development of a control system of the CVT unit and the development of a control system of the engine in parallel. Therefore, a development of the CVT ECU 8 in conformity to the CVT 4 and, a development of a new logic that the CVT ECU 8 performs, and so forth will be carried out without needing to wait for a development of an engine. The final adjustment on mating a CVT unit with an engine can be carried out swiftly. Accordingly, the total term for developing a vehicle equipped with a CVT unit can be shortened.

Here, in this embodiment, the CVT ECU 8 performs the gear ratio control and the clutch control, the engine ECU 6 performs the engine control, and the manager ECU 10 performs the gear ratio calculation, torque detection, axle torque determination, conversion, and operating point determination.

In the processes that the manager ECU 10 performs, the process at the step S180 performs the torque detection, the processes at the step S130 and S140 perform the axle torque determination, the process at the step S150 performs the conversion, the process at the step S160 performs the operating point determination, and the processes at the steps S170 to S190 perform the gear ratio calculation.

Although the embodiment of the invention has thus been described, the invention is not confined to the embodiment, various modifications and changes can be possible without departure of the technological scope of the invention.

In the foregoing embodiment, the manager ECU 10 is assumed to transmit various commands to the engine ECU 6 and the CVT ECU 8, in order to simplify the description of the vehicle control system. However, for example, in addition to the engine ECU 6 and the CVT ECU 8, an electronic control unit that controls brake devices equipped with the wheels, of a vehicle may be connected to the manager ECU 10, thereby controlling the behavior of the whole vehicle including the vehicle drive system as well as the brake system. Further, various information systems such as the navigation system and the like may be connected to the manager ECU 10, whereby the manager ECU 10 acquires information of the gradient, altitude, and so forth of the road on which the vehicle is now traveling, and integrally controls the vehicle drive system and the brake system and in accordance with the information, so as to optimize the drive torques of the drive wheels and the brake torques applied on the wheels during braking.

What is claimed is:

1. A vehicle control system comprising:

gear ratio control means that controls a gear ratio of a continuously variable transmission equipped in a vehicle;

gear ratio calculation means that calculates a command value of the gear ratio of the continuously variable transmission; and torque detection means that detects an input torque to the continuously variable transmission, wherein a gear ratio control unit having a function as the gear ratio control means and at least one functional unit having functions as the gear ratio calculation means and the torque detection means, being different from the gear ratio control unit, are mutually connected through a communication line capable of data transmission, and wherein the gear ratio control means controls the gear ratio of the continuously variable transmission on the basis of a command value of the gear ratio and an input torque which are transmitted to the gear ratio control unit through the communication line from the functional units.

2. The vehicle control system according to claim 1, wherein the at least one functional unit has the functions of:

axle torque determination means that determines a target axle torque demanded in accordance with a state of the vehicle;

conversion means that converts the target axle torque determined by the axle torque determination means into a power to be provided from an engine of the vehicle in order to achieve the target axle torque;

operating point determination means that determines, on the basis of a predetermined condition, an operating point determined from an engine torque and an engine speed, in order to extract the power converted by the conversion means from the engine; and engine control means that controls the engine on the basis of the engine torque determined by the operating point determination means, wherein the torque detection means detects the input torque on the basis of the engine torque determined by the operating point determination means, and wherein the gear ratio calculation means calculates a command value of the gear ratio of the continuously variable transmission on the basis of an engine speed determined by the operating point determination means.

3. The vehicle control system according to claim 2, wherein:

a demand axle torque determined on the basis of a driver's accelerator operation and a demand axle torque from at least one subunit that controls the vehicle are inputted to the axle torque determination means; and the axle torque determination means selects any one of the plural demand axle torques as the target axle torque on the basis of the predetermined condition, when a plurality of the demand axle torques are simultaneously inputted.

4. The vehicle control system according to claim 2, wherein:

the axle torque determination means compensates the value of the target axle torque on the basis of at least one of an inertia torque generated to the vehicle and a torque consumed by accessory devices that give an influence on the axle torque to make a variation thereof.

5. The vehicle control system according to claim 3, wherein:

the axle torque determination means compensates, when shifting from a first target axle torque determined from the plural demand axle torques to a second target axle torque determined next to the first target axle torque, the value of the target axle torque that the conversion means uses so as to smoothly shift to the second target axle torque from the first target axle torque.

6. The vehicle control system according to claim 2, further comprising:

a clutch mechanism constructed with a torque converter and a lockup clutch, disposed between the engine and the continuously variable transmission; and a functional unit having a function as clutch control means that executes an operation control of the clutch mechanism;

wherein the clutch control means operates the lockup clutch in a low speed range of the vehicle in such a manner that a difference between an engine speed that the engine outputs and an input rotational speed to the continuously variable transmission becomes equal to a predetermined value, and thereby controls such that the input rotational speed to the continuously variable transmission becomes equal to the engine speed determined by the operating point determination means.

7. The vehicle control system according to claim 3, wherein:

the subunits include at least one of a control system for a distance between vehicles, a vehicle stabilization system, an antilock brake system, and a traction system.

8. The vehicle control system according to claim 1, wherein:

the communication line is a network of a CSMA/CR system.

9. A vehicle control system comprising:

demand value determination means for determining a demand value of vehicle demanded in accordance with operation states of a vehicle;

conversion means for converting the demand value to a power that is provided from an engine;

operating point determination means for determining an operating point defining an engine torque and an engine speed based on a predetermined condition to drive the engine to provide the power;

engine control means for operating the engine in accordance with the defined engine torque;

gear ratio control means for controlling a gear ratio of an automatic transmission equipped in a vehicle in accordance with a gear ratio calculated from the engine speed and an input torque calculated from the engine torque; and a communication line connecting the operating point determination means and the gear ratio control means, wherein the automatic transmission is a continuously variable transmission.

10. The vehicle control system according to claim 9, wherein the communication line is configured in a CSMA/CR-type network.

* * * * *

UNITED STATES PATENT AND TRADEMARK OFFICE
CERTIFICATE OF CORRECTION

PATENT NO.    : 6,466,851 B2
DATED         : October 15, 2002
INVENTOR(S)   : Kato et al.

It is certified that error appears in the above-identified patent and that said Letters Patent is hereby corrected as shown below:

<u>Title page,</u>
Item [56], References Cited, U.S. PATENT DOCUMENTS, please add:

-- 5,470,290    11/1995  Minowa et al..........477/115
5,257,193       10/1993  Kusaka et al    364/531.07 --

Signed and Sealed this

Twenty-fifth Day of February, 2003

JAMES E. ROGAN
*Director of the United States Patent and Trademark Office*